United States Patent [19]
Allen

[11] Patent Number: 5,900,220
[45] Date of Patent: May 4, 1999

[54] SODA ASH PROCESSING METHOD

[75] Inventor: Stephen D. Allen, Holladay, Utah

[73] Assignee: Microbar Incorporated, Sunnyvale, Calif.

[21] Appl. No.: 09/008,707

[22] Filed: Jan. 16, 1998

Related U.S. Application Data

[XX .
[60] Provisional application No. 60/035,640, Jan. 16, 1997.

[51] Int. Cl.[6] ............................. B01D 61/16; C01D 7/22
[52] U.S. Cl. ....................... 423/179; 210/650; 210/651; 423/206.2; 423/421
[58] Field of Search .................................. 210/650, 651; 423/206.2, 421, 179

[56] References Cited

U.S. PATENT DOCUMENTS

| | | | |
|---|---|---|---|
| 1,324,118 | 12/1919 | Hottinger et al. | 210/702 |
| 3,075,645 | 1/1963 | Riddick | 210/197 |
| 3,097,163 | 7/1963 | Riddick | 210/53 |
| 3,101,317 | 8/1963 | Starry | 210/52 |
| 3,233,983 | 2/1966 | Bauer et al. | 423/206.2 |

(List continued on next page.)

OTHER PUBLICATIONS

S. A. Wasay, B. K. Puri and I. Haq, "Removal of Trace Heavy Metals by Metal Chelates", *Intern. J. Enviromental Studies*, vol. 36, pp. 191–197 (1990) (No Month).

G.B. Harris and S. Monette, "The Stability of Arsenic–Bearing Residues", presented at *TMS–AIME Symposium*, pp. 1–20 (Jan. 25–29, 1988).

T. Tetsumi, M. Sumi, M. Tanaka and T. Shono, "Direct Reaction of Metal Powders with Several Sodium Dithiocarbamates", *Polyhedron* vol. 5, pp. 707–710 (Sep. 2, 1985).

T. Tetsumi, M. Sumi, M. Tanaka and T. Shono, "Reaction of Copper Powder with Tetraalkylthiuram Disulphides", *Polyhedron*, vol. 4, pp. 1439–1442 (Feb. 6, 1985).

Stanislav Miertus and Vladimir Frecer, Theoretical Study of the Electron Structure and Properties of Dithiocarbmates and their Complexes with Transmition Metals, *Collection Czechoslavak Chem. Commun.*, vol. 49, pp. 2744–2750 (1984) (No Month).

R. R. Scharfe, V.S. Sastri and C. L. Chakrabarti, "Stability of Metal Dithiocarbamate Complexes", *Analytical Chemistry*, vol. 45, pp. 413–415 (Feb. 1973).

Serge J. Joris Keijo I. Aspila, and Chuni L. Chakrabarti, "On the Monobasic or Dibasic Character of Dithiocarbamic Acids", Analytical *Chemistry*, vol. 41, pp. 1441–1445 (Sep. 1969).

Keijo I. Aspila, Vedula S. Sastri and Chuni L. Chakrabarti, "Studies on the Stability of Dithiocarbamic Acids", *Talanta Review*, vol. 16, pp. 10990–1102 (Feb. 19, 1969).

Adam, Hulanick, "Complexation Reactions of Dithiocarbamates", Talanta Review, vol. 14, pp. 1371–1392 (May 24, 1967).

(List continued on next page.)

*Primary Examiner*—Wayne Langel
*Attorney, Agent, or Firm*—Madson & Metcalf

[57] ABSTRACT

A process and system for separating solids from concentration soda ash solution is disclosed. In the process, a soda ash solution feed stream containing solids and other impurities is treated with a chemical coagulant to create solid particles having a diameter greater than 5 microns. Treated feed stream is passed through a microfiltration membrane which physically separates the solids from the soda ash solution. Commercially available microfiltration membranes having a pore size from 0.5 micron to 5 microns may be used. Solids are removed from the membrane surface by periodically backflushing the microfiltration membranes and draining the filter vessel within which the membranes are located. The dislodged solid material within the filter vessel is flushed removed from the filter vessel for further processing or disposal.

20 Claims, 2 Drawing Sheets

5,900,220
Page 2

U.S. PATENT DOCUMENTS

| | | | |
|---|---|---|---|
| 3,521,752 | 7/1970 | Lindman | 210/56 |
| 3,544,476 | 12/1970 | Aiba et al. | 252/175 |
| 4,016,075 | 4/1977 | Wilkins | 210/42 R |
| 4,159,246 | 6/1979 | Matsumoto | 210/47 |
| 4,246,102 | 1/1981 | Hjelmner et al. | 210/704 |
| 4,260,493 | 4/1981 | Kretas et al. | 210/714 |
| 4,276,180 | 6/1981 | Matson | 210/683 |
| 4,374,102 | 2/1983 | Connelly et al. | 423/206.2 |
| 4,420,401 | 12/1983 | Kretas et al. | 210/714 |
| 4,450,057 | 5/1984 | Kelly | 204/98 |
| 4,504,356 | 3/1985 | Mülder et al. | 162/29 |
| 4,731,187 | 3/1988 | Moriya et al. | 210/719 |
| 4,765,913 | 8/1988 | Featherstone | 210/714 |
| 4,780,211 | 10/1988 | Lien | 210/644 |
| 4,938,876 | 7/1990 | Ohsol | 210/708 |
| 4,957,634 | 9/1990 | Bowers, Jr. | 210/711 |
| 5,078,900 | 1/1992 | Wegner | 210/638 |
| 5,108,620 | 4/1992 | Wester et al. | 210/725 |
| 5,164,095 | 11/1992 | Sparapany et al. | 210/735 |
| 5,171,453 | 12/1992 | Communal | 210/725 |
| 5,182,023 | 1/1993 | O'Conner | 210/652 |
| 5,205,939 | 4/1993 | Syrinek | 210/727 |
| 5,215,632 | 6/1993 | Fritts et al. | 204/95 |
| 5,246,686 | 9/1993 | Cuer et al. | 423/467 |
| 5,453,206 | 9/1995 | Browne | 210/711 |
| 5,510,040 | 4/1996 | Miller | 210/912 |
| 5,512,181 | 4/1996 | Matchett | 210/649 |
| 5,556,545 | 9/1996 | Volchek | 210/651 |
| 5,575,915 | 11/1996 | Nakamura | 210/651 |
| 5,605,633 | 2/1997 | Nakamura | 210/732 |
| 5,620,629 | 4/1997 | Salmen et al. | 252/180 |
| 5,685,990 | 11/1997 | Saugmann et al. | 210/650 |
| 5,783,159 | 7/1998 | Aldinger | 423/206.2 |

OTHER PUBLICATIONS

M. J. Janssen, "The Stability Constants of Metal Complexes of Some N–Dialkyldithiocarbamic Acids—Part II. Copper Complexes in Ethanol/Water Mixtures of Various Compositions", *Recueil,* vol. 76, pp. 827–835 (1957) (No Month).

M. J. Janssen, "The Stability Constants of Metal Complexes of Some N–Dialkyldithiocarbamic Acids—Part I. Copper Complexes in 74% ($^v/_v$) Ethanol Water", *Recueil,* vol. 75, pp. 1411–1422 (1956).

SODA ASH PROCESSING METHOD

RELATED PATENT APPLICATION

This invention is a continuation-in-part of U.S. Provisional Patent Application Ser. No. 60/035,640, filed Jan. 16, 1997, entitled Soda Ash Processing Apparatus and Method, which application is incorporated herein by reference.

FIELD OF THE INVENTION

The present invention relates to the processing of trona ore used to prepare soda ash. More particularly, the present invention relates to process and apparatus for separating desired liquid product from solid byproducts.

BACKGROUND OF INVENTION

Soda ash ($Na_2CO_3$) is a very high tonnage chemical raw material commonly used in glass making and in the production of sodium chemicals. A large proportion of soda ash is derived from the natural mineral trona, which occurs in great abundance near Green River, Wyo. Chemically, trona is sodium sesquicarbonate $Na_2CO_3.NaHCO_3.2H_2O$. After crushing, the natural ore is dissolved in agitated tanks to form a concentrated solution. Most of the impurities (boron oxides, calcium carbonate silica, sodium silicate, and shale rock) are insoluble in hot $H_2O$ and separate out upon settling. Upon cooling, the filtered sesquicarbonate solution forms fine needle-like crystals in a vacuum crystallizer. After centrifuging, the sesquicarbonate crystals are heated to about 240° C. in rotary calciners whereupon $CO_2$ and bound $H_2O$ are released to form natural soda ash. The crystals have a purity of 99.88% or more and handle easily without abrading or forming dust and thus assisting glassmakers and other users in obtaining uniform and homogeneous mixes.

A critical step in the production of soda ash is the separation of the concentrated soda ash solution from the solid impurities. The current method of separating the soda ash solution from the unwanted solids involves the addition of polymers or natural gums (such as guar gum) to the mixture to help coagulate the solid materials. Very large holding tanks (40 feet high and 110 feet wide) are used to allow the solids to settle over 24–30 hours. The liquid passing over a weir is further processed by filtration in a series of pressure leaf filters packed with diatomaceous earth. Carbon is commonly added to remove additional impurities. The liquid is then evaporated to cause crystallization of the soda ash product.

The solid underflow from the settling tanks is typically reprocessed to recover additional soda ash. Using 2° and 3° reprocessing steps, a typical recovery is from 88% to 93% of the total soda ash.

Current processing steps require high pressure pumps (75 psi) for the pressure leaf filters which consume large amounts of energy to operate. Current processing steps also require large holding tanks. Diatomaceous earth and carbon must be continuously purchased for use in the filtering and purification process.

It would be a significant advancement in the art to provide a process and system which efficiently separates soda ash solution from solid impurities such that 2° and 3° reprocessing is not necessary.

It would be a major advancement in the art to provide a process and system for separating soda ash solution from solid impurities which does not require large holding tanks and related land areas.

It would be a further advancement in the art to provide a process and system for separating soda ash solution from solid impurities which does not require the continual purchase of diatomaceous earth or carbon.

Such processes and systems are disclosed herein.

SUMMARY OF THE INVENTION

The present invention is directed to a process for separating soda ash solution from solid impurities. The present invention can readily be adapted for separating the liquid and solid ingredients by using suitable coagulant chemistry and microfiltration filter membranes. The coagulant reacts with the contaminant to form particulates having a size greater than about 5 $\mu$m.

Known and novel chemical coagulants are available to achieve the desired particulate formation. Organic and polymeric coagulants can also be used, such as polyacrylamides (cationic, nonionic, and anionic), epi-dma's (condensation polymerization product of epichlorohydrin and dimethylamine), DADMAC's (polydiallydimethylammonium chlorides), copolymers of acrylamide and DADMAC, natural guar, etc. The stoichiometric ratio of coagulant to solid material is preferably optimized to result in acceptable solid removal at minimum coagulant cost. The required coagulant concentration will depend on several factors, including solid influent concentration, water content, coagulant/solid reaction kinetics, etc.

Treated solid/soda ash solution is passed through a microfiltration membrane which physically separates the solid material from the soda ash solution. Suitable microfiltration membranes are commercially available from manufacturers such as W. L. Gore, Koch, and National Filter Media (Salt Lake City, Utah). For instance, a currently preferred membrane is a PTFE (polytetrafluoroethylene) membrane bonded to a polypropylene or polyethylene felt backing.

The microfiltration membranes are used in a tubular "sock" configuration to maximize surface area. The membrane sock is placed over a slotted tube to prevent the sock from collapsing during use. A net material is preferably placed between the membrane sock and the slotted tube to facilitate flow between the membrane and the slots in the tube. In order to achieve the extremely high volume flow rates, a large number of membrane modules, each containing a number of individual filter socks, are used.

The microfiltration membranes preferably have a pore size in the range from 0.5 micron to 5 micron, and preferably from 0.5 micron to 1.0 micron. By controlling the coagulant and its concentration, 99.99% of the precipitated particles can be greater than 5 microns. This allows the use of larger pore size microfiltration membranes. It has been found that the treated feed stream flow rate through 0.5 to 1 micron microfiltration membranes can be in the range from about 100 to about 700 gallons per square foot of membrane per day ("GFD"), and preferably from about 180 to 240 GFD.

Solids are preferably removed from the membrane surface by periodically backflushing the microfiltration membranes and draining the filtration vessel within which the membranes are located. The periodic, short duration back flush removes any buildup of contaminants from the walls of the microfiltration membrane socks. The dislodged solid material within the filtration vessel is flushed into a holding tank for further processing of the solids.

The treatment system disclosed herein is designed to provide efficient separation of solids from the soda ash solution. Soda ash solution and solids pretreatment chemistry creates insoluble solid particulates which are efficiently removed by the microfiltration membranes.

DETAILED DESCRIPTION OF THE INVENTION

Figure 1:
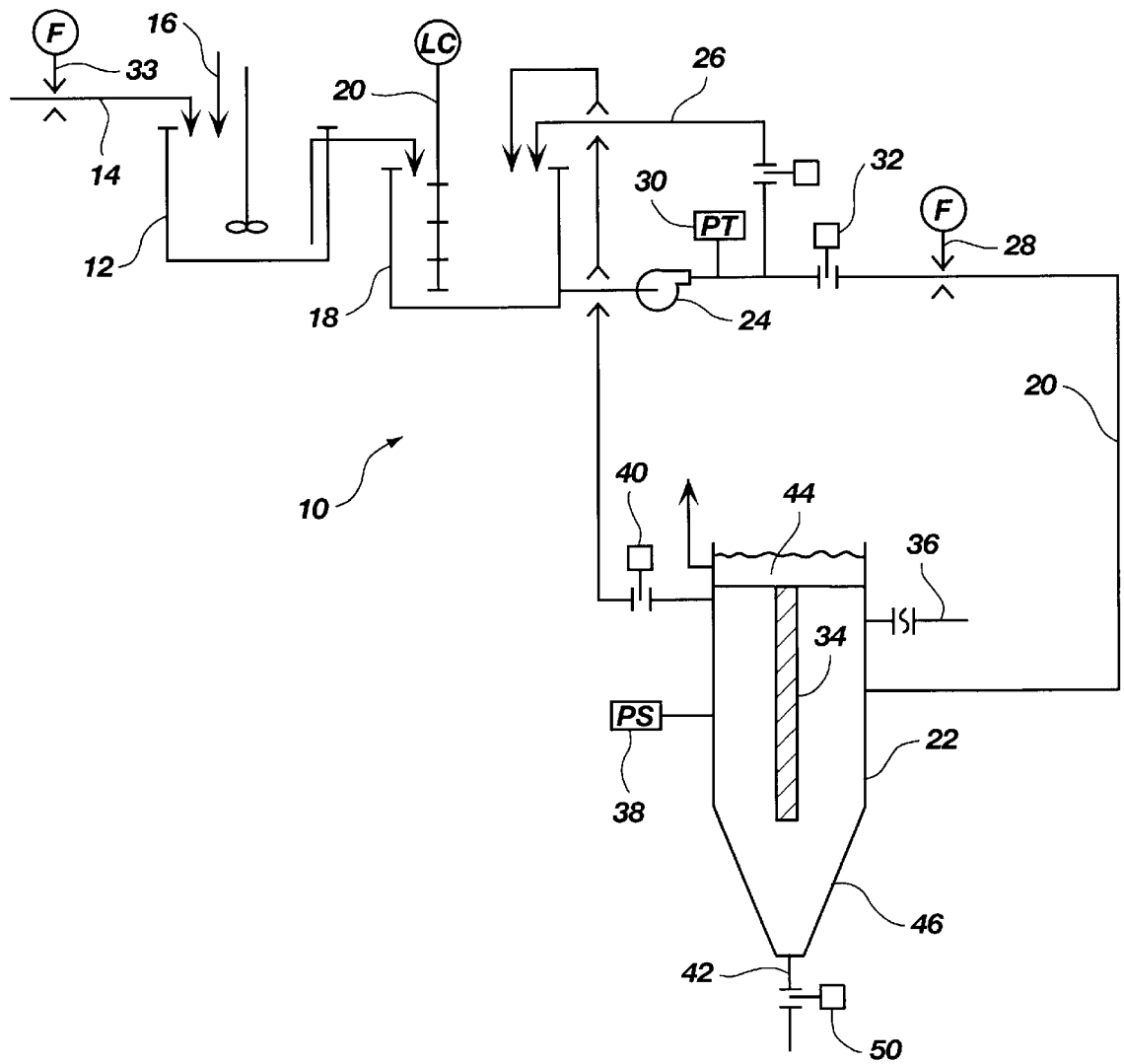
FIG. 1 is a schematic representation of one system for separating solids from a soda ash solution.

The present invention is directed to the processing of trona ore used to prepare soda ash. More specifically, the present invention relates to process and apparatus for separating desired liquid soda ash solution from solid byproducts. In operation, the solids are pretreated with one or more chemical coagulants to form particulates having a substantially larger size than the membrane pore size (nominal and absolute), yet uniform in size and mass. The formed particulates are typically greater than about 5 $\mu$m. The chemical coagulants are preferably mixed with the solids/soda ash solution using reaction vessels or static in-line mixers, although other mixing methods can be used. A currently preferred polymer is a polyamine having the following structure:

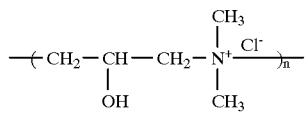

The molecular weight for this polymer preferably ranges from about 7000 to about 30,000. Other similar polymers can also be used as coagulants, including those described herein.

The treated soda ash solution is passed through a microfiltration membrane having a pore size in the range from 0.5 $\mu$m to 5 $\mu$m to remove the solid particulates. The microfiltration membrane is periodically backflushed to remove solids from the membrane surface. The rejected solids are gravity collected in the filter vessel bottom and time cycle discharged for further sludge processing.

The microfiltration membranes are preferably provided in a cassette arranged module. The microfiltration membranes provide a positive particle separation in a high recovery dead head filtration array. The dead head filtration operates effectively at low pressures (4 psi to 20 psi, preferably 7 psi to 18 psi) and high flow rates, allowing 100% discharge of the supplied soda ash solution with no transfer pumps needed. Solids which settle on the wall of the membrane during filtration are periodically backflushed away (and gravity settled) from the membrane surface to ensure a continuously clean filtration area. The individual cassette module design, such as that illustrated in FIG. 2, allows for easy replacement of the membrane modules.

Currently preferred filter socks useful with the present invention are manufactured by National Filter Media, Salt Lake City, Utah, consisting of a PTFE membrane thermally bonded to a polypropylene or polyethylene felt backing. Membrane "failure" is due primarily to flux loss, not mechanical failure. Many operations deem it more cost-effective to replace the membrane socks instead of cleaning contaminants from the membrane.

The membrane life is important to the continuous operation and operational cost of the filtration system. The membranes manufactured by National Filter Media, Salt Lake City, Utah have a 6 to 24 month life. The filtration system operates at a low pressure, preferably between 7 and 18 psi.

The operating pressure is preferably below 25 psi, but greater pressures, less than 75 psi, are possible. However, the higher the pressure, the quicker the membrane loss of flux. Furthermore, high pressures may require modification of the filter vessel design to permit higher pressures.

The following examples are offered to further illustrate the present invention. These examples are intended to be purely exemplary and should not be viewed as a limitation on any claimed embodiment.

EXAMPLE 1

A pilot scale test of the process within the scope of the present invention was conducted at the OCI Wyom., Green River, soda ash facility. Influent (feed source) for the pilot plant was obtained from OCI tank 3T1 via the OCI pump-pressurized line. This product was taken prior to addition of flocculent by the OCI process. The connection to the pilot plant was made via a 1-inch diameter 100 feet run of rubber hose.

Influent was received by the pilot plant into a 150 gallon feed/reaction tank. A low molecular weight polymer was introduced into the untreated, unfiltered OCI product in this feed/reaction tank by way of an LMI chemical metering pump. The average retention time of the feed/reaction tank was approximately 60 minutes.

A progressive-cavity process pump was used to create a pressurized feed loop to transfer the polymer-treated, unfiltered product to the filter vessel and to maintain an internal vessel pressure of 8 to 18 psi. The filter vessel contained 16 individual membrane cartridges which have a combined net surface area of approximately 20 ft$^2$. The product flowed through the membrane cartridges and into the top portion of the filter vessel. The filtrate residing in the top maintained a temperature of 138° F. to 142° F. during continuous operation with no additional energy input to the system. Heat loss was due to the 100 feet run of uninsulated feed source hose and the proximity to outside doors. Further, no attempts were made to insulate any part of the pilot plant for heat containment. Heat loss was not due to the process steps. In the described application relating to trona ore processing, heat loss is preferably minimized to prevent premature crystallization of soda ash product and resulting product loss.

When the level of filtrate in the top exceeded the height of the filter vessel's weir, the filtrate spilled over the weir and gravity flowed through a flow-metered line and into a filtrate holding tank. The filtrate stored in the holding tank was gravity drained to the OCI drain sump. Composite and grab samples were obtained from the outlet of the flow-metered filtrate line.

The flux of the product began at approximately 4.5 to 5 gpm at a filter vessel pressure of 8 to 14 psi and gradually decreases to a flux of approximately 2.0 to 2.5 gpm at a vessel pressure of 14 to 18 psi over a 5 to 8 minute period. The membranes were recoverable via a two step process as follows:

(1) Backflush: This was caused by the build-up of sludge cake on the exterior surface of the filter membranes. A pressure/flow reversal through the membranes, known as a backflush, was performed to shed this sludge cake from the exterior surface of the membranes. The filter vessel was equipped with a backflush valve and line located just below the filtrate. When feed from the process pump was temporarily suspended by the closing of the feed valve to the filter vessel, and the backflush valve opened, the weight of the filtrate volume in the filter vessel top provided the necessary pressure reversal to cause the sludge to shed from the exterior membrane surfaces. The volume of material used to perform a backflush (approx. 1–3 gallons) was gravity flowed into a 150 gallon backflush holding tank and then was immediately returned, via an air-driven diaphragm pump, into the 150 gallon feed/reaction tank for reprocessing. The backflush required from 1 to 8 seconds to complete. The pumping of the material from the backflush tank to the feed/reaction tank was performed simultaneously with the sludge removal cycle and, therefore, did not increase the non-process time.

It was observed that the key to a successful backflush was not in the volume of filtrate used in the backflush, but was the quick pressure drop within the filter vessel which allowed a small amount of backflush water to expand the filter membrane and crack and dislodge sludge caked onto the filter membranes. The sludge immediately broke off the membrane and settled to the bottom of the filter vessel. A typical pressure drop was from an operating pressure of 18 psi to about 5 psi. The pressure drop was often reached in 1 to 2 seconds. But in some cases, from 5 to 8 seconds were required to reach the desired pressure drop.

(2) Sludge Removal: Much of the sludge cake broke into ½" to 1" diameter pieces and rapidly settled to the bottom of the curved-bottom filter vessel. In order to remove the settled sludge cake from the bottom of the filter vessel, a sludge removal process was performed. After a brief settling period of 5 to 7 seconds, the filter vessel drain valve, which is mounted directly to the bottom of the filter vessel, was opened for 20 seconds, allowing the settled sludge to fill a 1.25 gallon chamber within the vessel drain pipe. Upon closing the vessel drain valve, the filtrate tank feed valve was reopened restoring filtrate processing while simultaneously opening the sludge valve to allow an air-driven diaphragm pump to remove the approximately 1.25 gallons of sludge from the sludge chamber area of the filter vessel drain pipe and transfer the sludge to a conical-bottom sludge holding tank. An air vent line with a check valve was used to allow the complete evacuation of the sludge from the filter vessel sludge chamber. The sludge pump operated for 20 seconds. The pilot plant PLC was programmed to perform a backflush and sludge removal cycle every 6 minutes (user-variable) with a non-production elapsed time of approximately 30 to 35 seconds.

After the backflush/sludge pump cycle was complete, the flux and filter vessel operating pressure were restored at or near the beginning peak flux of 4.5 to 5 gpm and 8 to 14 psi.

The following table provides a comparison between the results obtained with the process of the present invention and the typical results obtained in the existing OCI process:

|  | Invention | Existing OCI Process* |
|---|---|---|
| Soda Ash | 30.2% | 30.0% |
| NTU** | 1.0 | 1.5 |
| Effluent Recovery | 95+% | 80% |
| Underflow % Washed Solids | 21.0% | 10±% |
| $SiO_2$ | 91.0 | 286 (ppm) |
| Color | 132 | 146 |

*Sample taken after filtration through diatomaceous earth and carbon treatment.
**Normal Turbidimetric Unit Soda ash crystals formed from the filtered soda ash solution were compared with commercially available soda ash crystals under scanning electron microscope. No X-ray crystal habit modification was observed between the two soda ash crystals.

EXAMPLE 2

A bench scale test of the process within the scope of the present invention was conducted. A 5 gallon feed sample from the OCI Wyo., Green River, soda ash facility was taken prior to addition of flocculent by the OCI process. The sample was heated to 170° F. (±5° F.) and intermittently stirred to suspend solids for sampling. Samples were collected in 500 ml aliquots for chemical analysis and filtration testing. Testing was performed using an Emerson (Model M100EX) vacuum pump to simulate flow through the filter membrane.

Four six inch (6") membrane samples with an area of 28.27 square inches were tested for efficacy and efficiency. Each sample was tested with and without the use of polymer coagulants. Flux and solids loading were tested in the first screening without the use of coagulants. Two membranes (196-287-000 and 228-271-010, PTFE membranes on polypropylene felt) were rejected in the first screen due to very low flux. Two membranes (226-044-000, a double glazed polypropylene felt, and 226-215-980, PTFE membrane on polypropylene felt) tested in the first screen showed substantially better flux and were selected for additional testing.

The second test on the selected membranes was performed using the following polymers:

Epi-DMA polymer $3.0 \times 10^4$ molecular weight
Epi-DMA polymer $6.0 \times 10^4$ molecular weight
Epi-DMA polymer $4.0 \times 10^5$ molecular weight
DADMAC polymer $4.0 \times 10^5$ molecular weight
Acrylamide $2.2 \times 10^7$ molecular weight.

All polymers were screened at 1.0 ppm for efficacy, not efficiency. The polymer tests were conducted to determine if the polymers were in fact required. The screening was done for particle formation, not for settling characteristics.

The polymer determined to be the most efficacious was Epi-DMA polymer $3.0 \times 10^4$ molecular weight, which gave consistently well defined particulates uniform in size and shape. This uniformity and definition was achieved at levels as low as 0.5 ppm of a 30% solution. This product is a cationic medium molecular weight polymer generally described as an Epi-DMA (epichlorohydrin and dimethylamine reaction product).

Extensive testing determined that membrane 226-215-980 (PTFE membrane laminated on polypropylene felt, 2.8–5.0 micron pore size) and the 1.0 ppm addition of the Epi-DMA polymer gave the most optimal performance for filterability and flux. The solids were measured at 50+% after four test runs. The specific gravity of the filtered solution was measured at 1.33 at 160°±10° F. No change in pH of the influent or effluent was detected. The effluent product was cooled and crystallized. Tests determined that the filter and polymer provided consistently repeatable results for flux and quality of effluent. The flow through the membrane was 400 ml/1.25 min/28.27 sq. in. or 0.431 gpm/ft² or 620.6 GFD.

Reference is made to FIG. 1 which illustrates one possible system for separating solids from soda ash solution within the scope of the present invention. The illustrated soda ash processing system 10 includes a pretreatment reaction tank 12 in which an incoming process stream 14 is chemically treated with one or more chemical coagulants 16 to produce non-tacky, uniform particles. The process stream is chemically adjusted by volumetric addition based on the influent contaminant concentration between 0–4% by weight solids. The chemical coagulants are added either in-line or in a dedicated reaction tank as shown.

The chemically treated solids and soda ash solution flows to a feed tank 18 which maintains a homogeneous pretreated process stream source for one or more filtration loops. The feed tank 18 may serve as a reactor such as reaction tank 12. The feed tank 18 has a level control 20 to provide feed and process pump controls, as well as local tank level information. The feed tank 18 size is based on requirements for process pumps. It is preferably insulated to minimize heat loss.

A process loop 20 delivers pretreated process stream to the filter vessel 22. A pump 24 is preferably sized from 8 to 25 psi discharge pressure at the filter vessel 22 rated flow. The pump 24 can preferably vary in speed to deliver a constant flow to the filter vessel 22 at a variable pressure. As the pressure drop across the filter membranes increases, the feed pump 24 will increase speed, thereby increasing the discharge pressure, while maintaining a constant flow to the filter vessel 22. A process stream bypass 26 is provided to adjust loop pressure and to relieve the loop pressure during filtration backflush. The process loop instrumentation includes a flowmeter 28, a pressure transmitter 30, and a filter vessel flow control valve 32. A flowmeter 33 is preferably provided to measure the incoming process stream flow.

The filter vessel 22 operates in a dead head mode with membranes compatible to the temperature requirements, as well as the pretreated process stream. The filter membranes 34 preferably have a pore size from 0.5 to 5 microns for use with particles greater than 5 microns, resulting in minimum interstitial fouling. The filter vessel 22 includes overpressure protection 36, a pressure transmitter 38, a backflush system 40, a sludge removal system 42, and replaceable membranes 34.

Filter vessel overpressurization protection 36 consists of high pressure rupture disc and overpressurization sensor which shuts down the process pump 24 or closes the process feed valve 32. The pressure transmitter 38 monitors internal pressure to determine when to backflush the filter membranes 34 and to monitor the effectiveness of the backflush procedure.

The backflush system consists of a valve to relieve pressure on the feed side of the filter membranes 34. The resultant loss of pressure and some volume allows gravity flow of the filtrate 44 to reverse through the membrane dislodging the sludge accumulated on the feed side of the membranes 34. The buildup of sludge is evident due to the rise in pressure monitored by the pressure transmitter 38.

Upon reaching the maximum filter vessel pressure, the pump speed is preferably maintained at a constant rate for at least one minute or until the vessel product flow has dropped 10% below the rated flow of the vessel. At this point, there is a firm, partially dewatered filter cake surrounding the membrane. The backflush cycle begins with the feed valve closing, dead-heading the process pump. The backflush valve opens, relieving the "trapped" pressure in the vessel. The backflush is achieved due to the weight of the filtrate product reverse flowing through the membrane. This expands the membrane socks, breaking the filter cake. The heavy filter cake settles to the vessel bottom due to gravity. The filter vessel is then returned to operation. It is anticipated that the backflush cycle will take 20 to 30 seconds every 8 to 10 minutes.

The partially dewatered sludge settles into the cone area of the filter vessel 22, displacing lighter material. As the product filtrate flow is monitored, the dense sludge is removed at a rate such that the filtrate recovery is 90% to 95%, while the sludge is 10% to 5% of the raw product feed rate. There are several possible approaches for the recovery of the 18% to 22% by weight sludge are available.

One method of removing the sludge relies on the weight and pressure inside the filter vessel to "squeeze" the solids from the cone region 46 of the filter vessel 22. Another method for removing sludge is through a peristaltic hose pump. Peristaltic hose pumps are often used in the mining industry to move high solids materials. Yet another method of removing the sludge traps the heavy sludge in a compartment, for dedicated removal of the contents. In this approach, a large valve opens so that the heavier particles settle. This lowers the overall solids loading of the vessel when sludge valve is shut. Shutting the large valve isolates the heavier sludge from the feed stock so that the highest percentage of sludge can be removed. In any case, a sludge removal valve 50 is opened to allow the sludge to exit the filter vessel 22.

Figure 2:
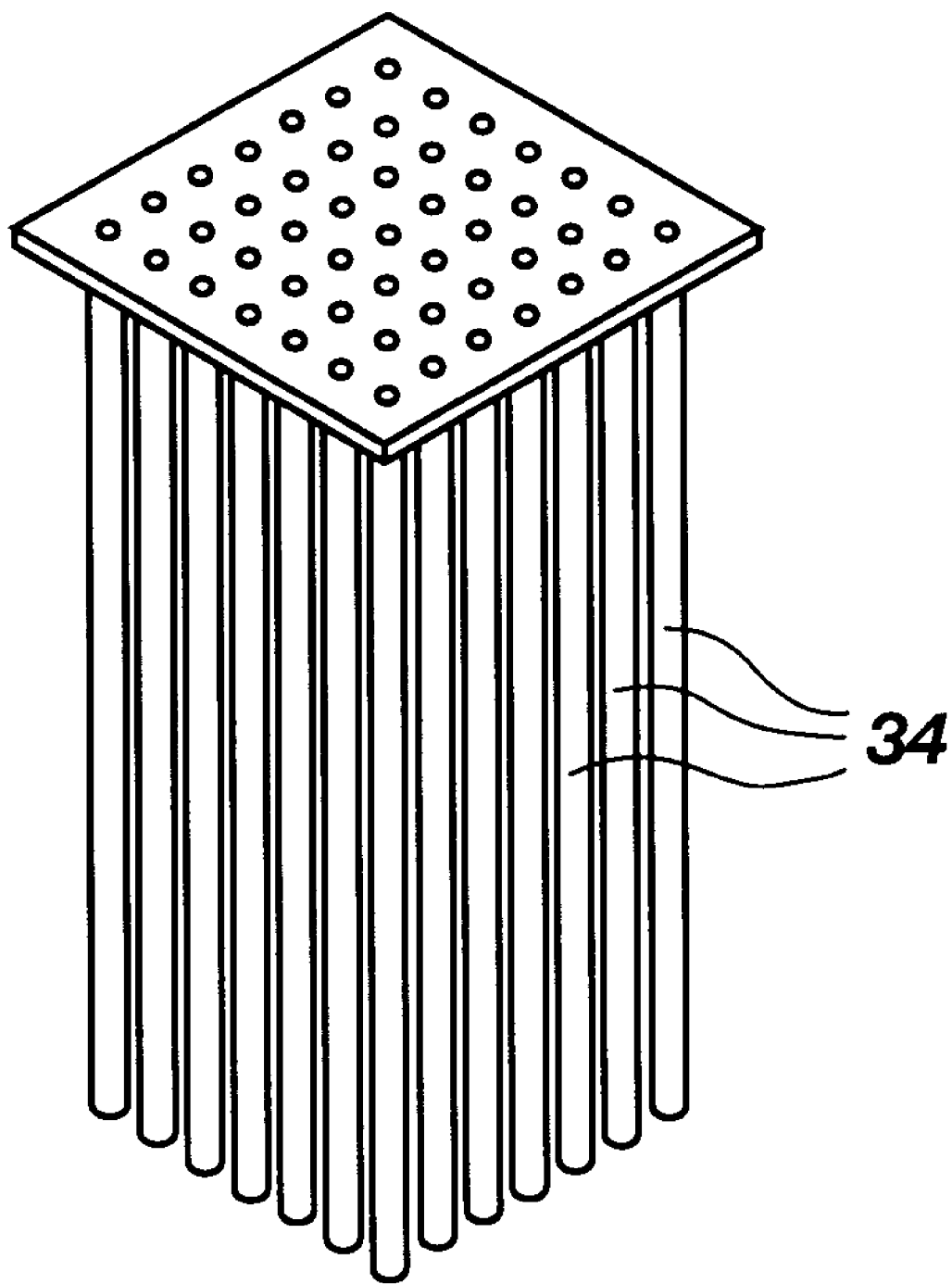
FIG. 2 is a representation of a typical filter membrane cassette used in a filter vessel within the scope of the present invention.

The filter membranes 34 should be replaceable, preferably in a cassette fashion. FIG. 2, illustrates one possible filter membrane cassette array. The tubular membranes are preferably arranged in a standard commercial array, provided the solids are not excessive.

The filtrate 44 is preferably collected at the top of the filter vessel 22 which flows by gravity to further treatment. The volume of filtrate 44 also serves as the backflush volume.

Multiple filter vessels can be used, in parallel, to provide for the required flow rate. However, the filter vessels can also be operated in series to provide primary filtration and secondary filtration. Because filter vessels are taken off line during the backflushing, additional filter vessels and capacity are preferably used to ensure that the require discharge flow is maintained. An additional filter vessel may be supplied to provide for off-line maintenance while the remainder of the system meets the flow rate requirements.

The soda ash process system preferably includes access to the various process streams to allow for sampling and analysis. The valves, pumps, and sensors customarily used in the art to safely control the described fluid flow to and from the filter vessels are preferably provided. Such valves, pumps, and sensors also allow for automation of the process.

From the foregoing, it will be appreciated that the present invention provides a number of significant advantages:

The particulate formation chemistry is capable of creating particles substantially larger than the membrane pore size (nominal and absolute), yet uniform in size and mass. This enables repeatable and consistent liquid/solid separations to be continuously maintained.

Because the process uses a positive barrier (filtration membrane), as reaction schemes and feed rates vary, the maintenance of particle sizing greater than the membrane pores is the only requirement for maintenance of the positive barrier. Whether the particle precipitates or floats is not relevant.

The process has lower chemical treatment cost and consumption, due in large part to the nature of the reactions. There is no need to create a settleable particle, only a particle supportable on the membrane surface.

The process produces lower sludge volumes because of the higher solids content and lower water content in the "solids" underflow. 22+% solids in the underflow and higher solids loading has been demonstrated.

Flux of the filter membranes indicate a range of 220 (existing low end) to 250 (high end) GFD (gallons/square foot/day) with optimization to follow (i.e. higher flux rates are possible). Evidence exists to indicate about 700 GFD is feasible.

The entire filter membrane surface is 100% recoverable. There are no indications after stress testing that the filters are subject to failure or flux loss on repeated use in the disclosed process.

Evidence exists for complete elimination of diatomaceous earth and pressure leaf filtration steps, thus reducing any potential $SiO_2$ breakthrough into the crystallizer feed and recirculation loops.

Evidence exists that carbon absorption can be reduced substantially and possibly eliminated from the process. Specific use could be for isolated treatable streams (fines bleed recirculation loop).

Labor costs can be reduced due to system automation and very little direct operator interface.

The filtration membranes require low maintenance. Off-site membrane restoration is currently contemplated. Low cost, rapid turn around is anticipated. Alternatively, easy, rapid clean-in-place (CIP) membrane restoration is possible. It is anticipated that cleaning would be required at least once every two months (4–24 hours off line). CIP is nontoxic, non-hazardous and can be sent directly to the drain.

The foregoing discussion has focused on the processing of trona ore to produce soda ash. Persons skilled in the mining industry will appreciate that the disclosed apparatus and method can be adapted to use in other ore mining applications which involve the separation of liquid and solid phases to extract a desired product. For instance, the foregoing process can be adapted for use in gold, silver, uranium, and vanadium mining. It can also be adapted for use in mining coal, kaolin, and potash.

The claimed invention is:

1. A process for removing unwanted impurities from a concentrated soda ash solution comprising the steps of:
    (a) treating a concentrated soda ash stream with an organic polymer coagulant, wherein the coagulant reacts with the impurities to form particulates having a size greater than about 5 $\mu$m;
    (b) passing the treated soda ash stream through a microfiltration membrane having a pore size in the range from 0.5 $\mu$m to 5 $\mu$m, such that the impurities are removed from the soda ash stream passing through the microfiltration membrane; and
    (c) periodically backflushing the microfiltration membrane to remove solids from the membrane surface.

2. A process according to claim 1, wherein the dose of coagulant to soda ash stream in the treating step is in the range from 0.5 to 450 ppm.

3. A process according to claim 1, wherein the dose of coagulant to soda ash stream in the treating step is in the range from 10 to 30 ppm.

4. A process according to claim 1, wherein the coagulant is an epichlorohydrin/dimethylamine polymer.

5. A process according to claim 1, wherein the coagulant is an epichlorohydrin/dimethylamine polymer having a molecular weight in the range from 50,000 to 100,000.

6. A process according to claim 1, wherein the coagulant is a polyamine having the following structure:

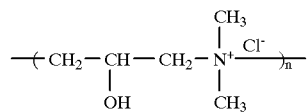

having a molecular weight in the range from about 7000 to about 30,000.

7. A process according to claim 1, wherein the coagulant is a DADMAC (polydiallydimethylammonium chloride) polymer.

8. A process according to claim 1, wherein the coagulant is a copolymer of an acrylamide and DADMAC (polydiallydimethylammonium chloride).

9. A process according to claim 1, wherein the membrane is a PTFE (polytetrafluoroethylene) membrane bonded to a polypropylene felt backing.

10. A process according to claim 1, wherein the membrane is a PTFE (polytetrafluoroethylene) membrane bonded to a polyethylene felt backing.

11. A process according to claim 1, wherein the membrane is a polypropylene membrane bonded to a polypropylene or polyethylene felt backing.

12. A profess according to claim 1, wherein the treated soda ash stream is passed through the microfiltration membrane at a pressure less than 75 psi.

13. A process according to claim 1, wherein the treated soda ash stream is passed through the microfiltration membrane at a pressure less than 25 psi.

14. A process according to claim 1, wherein the treated soda ash stream is passed through the microfiltration membrane at a pressure in the range from about 4 psi to 20 psi.

15. A process according to claim 1, wherein the treated soda ash stream is passed through the microfiltration membrane at a pressure in the range from about 7 psi to 18 psi.

16. A process according to claim 1, wherein the treated soda ash stream is passed through the microfiltration membrane at a flow rate in the range from 100 gallons per square foot of membrane per day ("GFD") to 700 GFD.

17. A process according to claim 1, wherein the treated soda ash stream is passed through the microfiltration membrane at a flow rate in the range from 180 gallons per square foot of membrane per day ("GFD") to 240 GFD.

18. A process for removing unwanted impurities from a concentrated soda ash solution comprising the steps of:
    (a) treating a concentrated soda ash stream with an organic polymer coagulant selected from epichlorohydrin/dimethylamine, DADMAC (polydiallydimethylammonium chloride), copolymers of an acrylamide and DADMAC (polydiallydimethylammonium chloride), and a polyamine having the following structure:

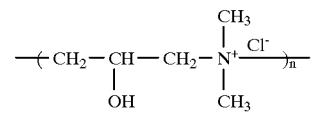

wherein the dose of coagulant to soda ash stream is in the range from 0.5 to 450 ppm, wherein the coagulant reacts with the impurities to form particulates having a size greater than about 5 $\mu$m;
    (b) passing the treated soda ash stream through a microfiltration membrane having a pore size in the range from 0.5 $\mu$m to 5 $\mu$m, such that the impurities are removed from the soda ash stream passing through the microfiltration membrane, wherein the microfiltration membrane is a PTFE (polytetrafluoroethylene) membrane bonded to a polypropylene or polyethylene felt backing, and wherein the treated soda ash stream is passed through the microfiltration membrane at a pressure less than 75 psi; and
    (c) periodically backflushing the microfiltration membrane to remove solids from the membrane surface.

19. A process according to claim 18, wherein the treated soda ash stream is passed through the microfiltration membrane at a flow rate in the range from 100 gallons per square foot of membrane per day ("GFD") to 700 GFD.

20. A process for removing unwanted impurities from a concentrated soda ash solution comprising the steps of:
    (a) treating a concentrated soda ash stream with an epichlorohydrin/dimethylamine polymer coagulant, wherein the dose of coagulant to soda ash stream is in the range from 10 to 30 ppm, wherein the coagulant reacts with the impurities to form particulates having a size greater than about 5 µm;

(b) passing the treated soda ash stream through a microfiltration membrane having a pore size in the range from 0.5 µm to 5 µm, such that the impurities are removed from the soda ash stream passing through the microfiltration membrane, wherein the microfiltration membrane is a PTFE (polytetrafluoroethylene) membrane bonded to a polypropylene or polyethylene felt backing, and wherein the treated soda ash stream is passed through the microfiltration membrane at a pressure in the range from 4 psi to 20 psi and at a flow rate in the range from 100 gallons per square foot of membrane per day ("GFD") to 700 GFD; and (c) periodically backflushing the microfiltration membrane to remove solids from the membrane surface.

* * * * *